United States Patent [19]

Kobayashi et al.

[11] Patent Number: 4,859,299

[45] Date of Patent: Aug. 22, 1989

[54] NOVEL PERFLUOROPOLYETHER AND PROCESS FOR PRODUCING THE SAME

[75] Inventors: Kazuo Kobayashi; Masashi Fukazawa; Shinji Ishikawa, all of Kitaibaraki, Japan

[73] Assignee: Nippon Mektron, Ltd., Tokyo, Japan

[21] Appl. No.: 115,841

[22] Filed: Nov. 2, 1987

[30] Foreign Application Priority Data

Nov. 28, 1986 [JP] Japan ............................... 86-283932

[51] Int. Cl.$^4$ ............................................... C07C 41/01
[52] U.S. Cl. ......................... 204/157.92; 204/157.94; 204/158.11; 204/158.12
[58] Field of Search ..................... 204/157.92, 157.94, 204/157.11, 158.12

[56] References Cited

U.S. PATENT DOCUMENTS 3,704,214 11/1972 Sianesi et al. .................. 204/157.92
3,715,378 2/1973 Sianesi et al. .................. 204/157.92

Primary Examiner—John F. Niebling
Assistant Examiner—Kathryn Gorgos
Attorney, Agent, or Firm—Fred Philpitt

[57] ABSTRACT

A novel perfluoropolyether containing 0.1 to 10% by weight of halogen atoms as bonded in the molecule is obtained by reacting tetrafluoroethylene with oxygen in a fluorinated solvent or a chlorofluorinated solvent under ultraviolet irradiation in the presence of a halogenated hydrocarbon chain transfer agent having a chain transfer coefficient with respect to methyl methacrylate of at least $5 \times 10^{-5}$.

4 Claims, No Drawings

NOVEL PERFLUOROPOLYETHER AND PROCESS FOR PRODUCING THE SAME

BACKGROUND OF THE INVENTION

1. Field of the Invention

This invention relates to novel perfluoropolyether and a process for producing the same, and particularly to novel perfluoropolyether obtained by reaction of tetrafluoroethylene with oxygen in a fluorinated solvent or chlorofluorinated solvent under ultraviolet irradiation and a process for producing the same.

2. Description of the Prior Art

It is well-known to produce perfluoropolyether by reaction of tetrafluoroethylene with oxygen in a fluorinated solvent or chlorofluorinated solvent under ultraviolet irradiation (see, for example, Japanese Patent Publication No. 55-50052, etc.).

The thus obtained perfluoropolyether has active fluorine and active oxygen bonds and a broad range of controllable viscosity, and thus is useful as an intermediate for synthesis of a cross-linking agent, a polymeric surfactant, etc.

Neutral perfluoropolyethers whose active groups are decreased by heat treatment, fluorine treatment, etc. of the said perfluoropolyether has a wide range of industrial applications as base oil for high performance grease, vacuum pump oil, a special lubricant for magnetic disks, a lubricant for rockets, etc. owing to higher chemical and physical stabilities orignating from its structure.

In these applications, the molecular weight of perfluoropolyether is an important problem. The said Japanese Patent Publication No. 55-50052 discloses that the molecular weight depends upon the dosage of ultraviolet irradiation and the feed rate of the monomer for the reaction, and that the molecular weight is lowered with increasing dosage of ultraviolet irradiation and increased with increasing feed rate of the monomer.

This relationship means that, in order to obtain a product of, for example, lower molecular weight, an ultraviolet irradiation apparatus of larger capacity must be used, when viewed from the apparatus design, whereas, in order to lower the feed rate, very disadvantageous conditions must be selected, when viewed from the production cost and reaction efficiency.

As a result of extensive studies of a process for producing perfluoropolyether having a low molecular weight, free from these problems, the present inventors have found that these problems can be effectively solved and perfluoropolyether having a desired range of molecular weight can be obtained according to a telomerization procedure using a halogenated hydrocarbon chain transfer agent as a telogen, and have found at the same time that the thus obtained perfluoropolyether has an active halogen bond originating from the employed halogenated hydrocarbon chain transfer agent in the molecule, and thus can be used as a novel intermediate.

SUMMARY OF THE INVENTION

An object of the present invention is to provide novel perfluoropolyether containing halogen atoms as bonded in the molecule.

Another object of the present invention is to provide a process for producing such a novel perfluoropolyether.

Other object of the present invention is to provide a process for decreasing the amount of active oxygen or active halogen as bonded in such novel perfluoropolyether.

DETAILED DESCRIPTION OF THE PREFERRED EMBODIMENTS

The present novel perfluoropolyether, whose main chain is composed of a combination of the following structural units arranged linearly at random and which contains 0.01 to 10% by weight of chlorine, bromine or iodine atoms as bonded in the molecule, has a molecular weight ranging from about 200 to 25,000:

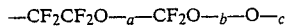

wherein
$a+b = 2-230$
$b/a = 0.1-10$, and
$c/(a+b) = 0-1.0$, preferably $0-0.5$

Production of a portion of such novel perfluoropolyether is carried out by reaction of tetrafluoroethylene with oxygen in a fluorinated solvent or a chlorofluorinated solvent under ultraviolet irradiation in the presence of a halogenated hydrocarbon chain transfer agent having a chain transfer coefficient with respect to methyl methacrylate of at least $5 \times 10^{-4}$ at 60° C., whereby perfluoropolyether containing 0.1 to 10% by weight of chlorine, bromine or iodine atoms as combined in the molecule and having a $c/(a+b)$ ratio of $0.01-1.0$ can be formed.

Terminal group at one end of the thus formed perfluoropolyether is presumed to include, for example, COF, OCOF, OCF$_3$, OCF$_2$COF, Cl, Br, I, CCl$_3$, CBr$_3$, CI$_3$, etc., and that at the other end is presumed to include, for example, CF$_3$, COF, CF$_2$COF, CF$_2$Cl, CF$_2$Br, CF$_3$I, CF$_2$CF$_2$Cl, CF$_2$CF$_2$Br, CF$_2$CF$_2$I, CF$_2$CCl$_3$, CF$_2$CBr$_3$, CF$_2$CI$_3$, CF$_2$CF$_2$CCl$_3$, CF$_2$CF$_2$CBr$_3$, CF$_2$CF$_2$CI$_3$, etc., and the above presumption can be supported to some extent, but their exact identification is quite difficult to make.

Reaction of tetrafluoroethylene with oxygen in a fluorinated solvent or a chlorofluorinated solvent under ultraviolet irradiation can be generally carried out according to a conventional process.

Reaction solvent for use in the present invention is a solvent insusceptible to chain transfer such as dichlorotetrafluoroethane, trichlorotrifluoroethane, dichlorodifluoroethane, etc. A halogenated hydrocarbon chain transfer agent is dissolved or suspended in the said solvent, and then the solution or suspension is cooled to a temperature of about $-40°$ to about $10°$ C. Then, an ultraviolet light source made of quartz for effectively emittthing ultraviolet rays of short wavelength, i.e. not more than 330 nm, was turned on to expose the solution or suspension to ultraviolet irradiation, and tetrafluoroethylene monomer and oxygen at predetermined concentrations are fed to the solution or suspension under ultraviolet irradiation to initiate the reaction. The monomer is fed in a gaseous state to the reaction system, and oxygen is fed thereto, as diluted with nitrogen, etc., as desired, or air as such is fed thereto.

A halogenated hydrocarbon chain transfer agent for use in the present invention has a chain transfer coefficient with respect to methyl methacrylate (C=Ktr/Kp, 60° C.) of at least $5.0 \times 10^{-4}$.

| C value with respect to methyl methacrylate: | |
| --- | --- |
| $CH_2Cl_2$ | $1.00 \times 10^{-5}$ |
| $CHCl_3$ | $4.54 \times 10^{-5}$ |
| $CCl_4$ | $9.25 \times 10^{-5}$ |
| $CBr_4$ | $2.7 \times 10^{-1}$ |
| $CI_4$ | (larger that that for $CBr_4$) |

It is obvious from these values that carbon tetrabromide and carbon tetraiodide are preferable halogenated hydrocarbon chain transfer agents, and they can be appropriately selected in view of viscosity, etc. of the desired product. For example, a lower viscosity can be effectively obtained with larger atomic number of a halogen atom or by a higher chain transfer coefficient. On the other hand, the desired objects of the present invention can be hardly obtained with chloroform having a chain transfer coefficient of lower than $5.0 \times 10^{-4}$.

The amount of the chain transfer agent for use in the present invention depends upon the power of ultraviolet rays, and is generally in order to $10^{-7}$ to $10^{-2}$ moles, preferably $10^{-6}$ to $10^{-3}$ moles per W of ultraviolet power.

The thus obtained perfluoropolyether contains active oxygen and active halogen due to the halogenated hydrocarbon chain transfer agent as each bonded in the molecule, and the $c/(a+b)$ ratio of active oxygen can be reduced from 0.01–1.0 to 0–0.1 according to any one of the following procedures:

(1) by heating to a temperature of about 150° C. to about 300° C., preferably about 180° C. to about 240° C. in an inert gas atmosphere such as a nitrogen gas.

(2) by ultraviolet irradiation at a temperature of about −50° C. to about 100° C., preferably about −30° C. about 50° C., desirably in a fluorinated solvent or a chlorofluorinated solvent.

By these treatments, the content (c) of active oxygen can be reduced to zero, whereby perfluoropolyether can be converted to the one having no oxidative power or a restricted oxidative power, though not reduced to zero.

By treating the perfluoropolyether, from which the active oxygen has been removed or reduced, with a fluorine gas, preferably a fluorine gas diluted with an inert gas such as nitrogen, etc. at a temperature of about 150° C. to about 300° C., preferably about 180° C. to about 240° C., the active halogen in the molecule can be replaced with fluorine, whereby perfluoropolyether containing no active halogen at all can be obtained. However, perfluoropolyether whose chlorine, bromine or iodine atom content has been reduced to 0.01–1.0% by weight is generally obtained by selecting the treating conditions so as to meet the proper object of using perfluoropolyether. That is, when perfluoropolyether is used in the proper use as an inert fluid, the active halogen content is preferably not more than 0.05% by weight, whereas in case of using it as an intermediate, not less than 0.1% by weight is preferable.

Perfluoropolyether on various levels obtained according to a series of such reaction steps are subjected to the following various kinds of analysis to determine their structures.

Perfluoropolyether obtained according to the following Example 6 as a typical example, using carbon tetrabromide as a halogenated hydrocarbon chain transfer agent had the following properties:

Kinetic viscosity: 35 Cst

Active oxygen: 1.9% as free $I_2$ according to an $I_2$ quantitative determination by oxidation in a NaI/acetic anhydride system Molecular weight: 4,900, value obtained from solution viscosity in Fc-75 solvent b/a: 4.7, value calculated from values a and b by $F^{19}$-NMR Br elemental analysis: 0.74%, a value obtained by halogen special analysis The said perfluoropolyether was subjected to heat treatment in a nitrogen gas stream at 220° C. for 24 hours, and then subjected to quantitative determination of active oxygen in the same manner as above and found to be zero as free $I_2$. That is, the thus treated perfluoropolyether had no more oxidative power.

To analyze the structure of the perfluoropolyether in more detail, it was subjected to thermal decomposition mass spectral measurement, where natural bromine contained $Br^{79}$ and $B^{81}$ isotopes substantially in a ratio of 1:1 to give peculiar mass fragment ion peaks, that is to obtain more exact information on the structure. The thus obtained fragment ion peaks had the following identifications.

| m/e | Identification | m/e | Indentification |
| --- | --- | --- | --- |
| 66 | $CF_2O$ | 301 | $C_2F_5OCF_2OC_2F_4$ |
| 69 | $CF_3$ | 245 | $CF_2Br^{79}C_2F_4O$ |
| 100 | $CF_2CF_2$ | 247 | $CF_2Br^{81}C_2F_4O$ |
| 135 | $C_2F_5O$ | 179 | $CF_2Br^{79}CF_2$ |
| 201 | $C_2F_5OCF_2O$ | 181 | $CF_2Br^{81}CF_2$ |
| 235 | $C_2F_5OC_2F_4$ | 129 | $CF_2Br^{79}$ |
| 251 | $C_3F_7OC_2F_4O$ | 131 | $CF_2Br^{81}$ |

It was confirmed that ratios of mass ion strength of the $Br^{79}$-containing group to that of $Br^{81}$-containing group were 1:1 at the respective m/e values (245, 247), (179, 181) and (129, 131).

Then, perfluoropolyether whose active oxygen had been removed was heated to 200° C. in a glass reactor vessel, and a fluorine gas diluted with a nitrogen gas to a concentration of 20% was fed to the reactor vessel to create bubbling. Eight hours after the bubbling, the bromine content of the perfluoropolyether was found to be 0.1% by weight. The bubbling was further continued for 16 hours, and it was found by measurement of Br content that there was no bromine at all, and neutral perfluoropolyether was obtained. Thermal decomposition mass spectral analysis of the thus obtained perfluoropolyether revealed that there were no more Br-containing fragment peaks, and the bromine was completely replaced with fluorine.

According to the present process using carbon tetrabromide or carbon tetraiodide as a chain transfer agent, the following effects can be obtained:

(1) Perfluoropolyether of low viscosity can be formed with an ultraviolet power source of lower output power, and very larger advantages can be obtained in the apparatus design and reaction efficiency than those of a conventional process.

(2) When the viscosity of a product is lowered according to a conventional process, the b/a ratio, the active oxygen content, etc. are changed together with the viscosity, whereas in the present invention, only the viscosity can be lowered without changing these values.

(3) According to the prior art disclosed in the said Japanese Patent Publication No. 55-50052, it is stated that the b/a value is in a range of 0.2–20 and values of 1.50–18.80 are actually shown in Examples, whereas the the b/a value of perfluoropolyether obtained according to present process is always not more than 10. That is, it can be seen that a tendency to decompose the $CF_2CF_2O$ group to the $CF_2O$ group is low.

(4) The present perfluoropolyether contains active halogens originating from the chain transfer agent as contained in the molecule, and thus the reaction can be carried out by utilizing the active halogen, or the active halogen can be replaced with fluorine, if necessary.

The present invention will be described in detail below, referring to examples.

EXAMPLE 1 (REFERENCE EXAMPLE)

9 kg of dichlorotetrafluoroethane as a reaction solvent and 10.8 g (0.07 moles) of carbon tetrachloride as a chain transfer agent were charged into a reactor of ultraviolet internal irradiation type having a quartz inner cylinder of 6 l capacity and cooled to $-20°$ C. A 400 W, high pressure mercury lamp was used as an ultraviolet irradiation source, and 4 moles/hr of tetrafluoroethylene and 8 moles/hr of oxygen, both in a gaseous state, were fed into the reactor to conduct reaction, while controlling the reaction temperature.

During the reaction, the temperature was controlled to $-20°$ C.$\pm2°$ C. while always keeping the monomer flow rate constant. After the end of the reaction, the solvent was removed from the reaction mixture by distillation, and the resulting oily matters were heated to a temperature of 60° C. to 80° C. to cause complete removal of the solvent.

The resulting oily matters were subjected to determination of kinetic viscosity, reduced viscosity, using Fc-75 (in terms of molecular weight), a, b and c values, and active halogen content.

COMPARATIVE EXAMPLE 1

The reaction was carried out in the same manner as in Example 1, except that no carbon tetrachloride was used.

EXAMPLES 2-4

The reaction was carried out in the same manner as in Example 1, except that carbon tetrabromide was used as a chain transfer agent in amount of 0.995 g (0.003 moles) for Example 2, 9.95 g (0.03 moles) for Example 3 and 99.5 g (0.3 moles) for Example 4.

EXAMPLE 5

The reaction was carried out in the same manner as in Example 3, except that the reactor capacity was changed to 20 l, the high pressure mercury lamp output power to 300 W, the reaction temperature to $-25°$ C.$\pm2°$ C., and the tetrafluoroethylene flow rate to 2.6 moles/hr.

EXAMPLE 6

The reaction was carried out in the same manner as in Example 5, except that the amount of carbon tetrabromide was changed to 14.925 g (0.045 moles) and the tetrafluoroethylene flow rate to 1.3 moles/hr.

COMPARATIVE EXAMPLES 2-4

The reaction was carried out in the same manner as in Example 6, except that no carbon tetrabromide was used and the tetrafluoroethylene flow rate was changed to 0.6 moles/hr. for Comp. Ex. 2, 0.8 moles/hr for Comp. Ex. 3 and 1.3 moles/hr for Comp. Ex. 4.

EXAMPLES 7 AND 8

The reaction was carried out in the same manner as in Example 6, except that the high pressure mercury lamp output power was changed to 200 W, the amount of carbon tetrabromide was changed to 4.64 g (0.014 moles) for Example 7 and 9.95 g (0.03 moles) for Example 8, and the tetrafluoroethylene flow rate was changed to 1.8 moles/hr for Example 7 and 2.1 moles/hr for Example 8.

COMPARATIVE EXAMPLE 5

The reaction was carried out in the same manner as in Examples 7-8, except that no carbon tetrabromide was used and the tetrafluoroethylene flow rate was changed to 2.7 moles/hr.

EXAMPLES 9 AND 10

The reaction was carried out in the same manner as in Example 6, except that the high pressure mercury lamp output power was changed to 100 W, the amount of carbon tetrabromide was changed to 8.96 g (0.027 moles) for Example 9 and 17.91 g (0.054 moles) for Example 10, the reaction temperature was changed to $-28°$ C.$\pm2°$ C., and the tetrafluoroethylene flow rate was changed to 1.6 moles/hr.

EXAMPLES 11 AND 12

The reaction was carried out in the same manner as in Examples 9-10, except that carbon tetraiodide was used as a chain transfer agent in an amount of 10.39 g (0.02 moles) for Example 11 and 20.79 g (0.04 moles) for Example 12, and the reaction temperature was changed to $-27°$ C.$\pm2°$ C.

The measurement results in the foregoing Examples and comparative Examples are shown in the following Table 1.

TABLE 1

| | Chain transfer agent/ultraviolet output power (mole/W) | Kinetic viscosity (40° C.) (Cst) | Molecular weight | a | b | c | a + b | b/a | $\frac{c}{a+b}$ | Active oxygen (wt. %) | Active halogen (wt. %) |
|---|---|---|---|---|---|---|---|---|---|---|---|
| Ex. 1 | $1.75 \times 10^{-4}$ | 39 | 5200 | 11.1 | 54.6 | 4.6 | 65.7 | 4.9 | 0.07 | 1.4 | 0.29 |
| Comp. Ex. 1 | — | 79 | 7400 | 19.5 | 72.3 | 8.3 | 91.8 | 3.7 | 0.09 | 1.8 | — |
| Ex. 2 | $7.5 \times 10^{-6}$ | 35 | 4900 | 12.3 | 47.9 | 5.2 | 60.2 | 3.9 | 0.09 | 1.7 | — |
| Ex. 3 | $7.5 \times 10^{-5}$ | 7.6 | 2100 | 3.8 | 21.3 | 1.4 | 25.1 | 5.6 | 0.06 | 1.1 | — |
| Ex. 4 | $7.5 \times 10^{-4}$ | 2.3 | 1100 | 4.0 | 5.2 | 3.6 | 9.2 | 1.3 | 0.39 | 5.3 | 6.5 |
| Ex. 5 | $1.0 \times 10^{-4}$ | 78 | 7600 | 37.7 | 41.5 | 15.7 | 79.2 | 1.1 | 0.20 | 3.3 | 0.69 |
| Ex. 6 | $1.5 \times 10^{-4}$ | 35 | 4900 | 10.7 | 50.5 | 5.8 | 61.2 | 4.7 | 0.09 | 1.9 | 0.74 |
| Comp. Ex. 2 | — | 27 | 4200 | 5.3 | 50.1 | 3.2 | 55.4 | 9.5 | 0.06 | 1.2 | — |
| Comp. Ex. 3 | — | 93 | 8300 | 15.0 | 94.2 | 7.3 | 109.2 | 6.3 | 0.07 | 1.4 | — |
| Comp. Ex. 4 | — | 179 | 11900 | 23.9 | 131.7 | 12.6 | 155.6 | 5.5 | 0.08 | 1.7 | — |
| Ex. 7 | $7.0 \times 10^{-5}$ | 211 | 13000 | 52.5 | 94.5 | 27.6 | 147.0 | 1.8 | 0.19 | 3.4 | 0.66 |
| Ex. 8 | $1.5 \times 10^{-4}$ | 68 | 7000 | 26.2 | 52.5 | 16.6 | 78.7 | 2.0 | 0.21 | 3.8 | 0.70 |
| Comp. Ex. 5 | — | 2000 | 45000 | 214.0 | 279.4 | 87.2 | 493.4 | 1.3 | 0.18 | 3.1 | — |

TABLE 1-continued

| | Chain transfer agent/ultraviolet output power (mole/W) | Kinetic viscosity (40° C.) (Cst) | Molecular weight | a | b | c | a + b | b/a | $\frac{c}{a+b}$ | Active oxygen (wt. %) | Active halogen (wt. %) |
|---|---|---|---|---|---|---|---|---|---|---|---|
| Ex. 9 | $2.7 \times 10^{-4}$ | 540 | 21800 | 131.2 | 78.7 | 72.2 | 209.9 | 0.6 | 0.34 | 5.3 | — |
| Ex. 10 | $5.4 \times 10^{-4}$ | 257 | 14500 | 95.0 | 38.0 | 46.2 | 133.0 | 0.4 | 0.35 | 5.1 | — |
| Ex. 11 | $2.0 \times 10^{-4}$ | 280 | 15200 | 95.0 | 47.5 | 51.3 | 142.5 | 0.5 | 0.36 | 5.4 | — |
| Ex. 12 | $4.0 \times 10^{-4}$ | 113 | 9300 | 62.9 | 18.9 | 32.6 | 81.8 | 0.3 | 0.40 | 5.6 | 1.26 |

From the foregoing results, the following facts are obvious.

(1) Carbon tetrabromide and carbon tetraiodide effectively act as a telogen in the reaction.

(2) The viscosity and the molecular weight are increased with decreasing amount of the chain transfer agent, but an equivalent action as a telogen can be obtained with carbon tetrabromide in an amount of less than 1/10 of that of carbon tetrachloride.

(3) A slight increase in the tetrafluoroethylene flow rate leads to a rapid increace in the viscosity of a product, and in order to obtain a product of low viscosity it is necessary to control tetrafluoroethylene to a low flow rate.

(4) A decrease in the ultraviolet irradiation dosage in the absence of a chain transfer agent leads to a rapid increase in the viscosity and the molecular weight, whereas no such a tendency is observable in the presence of a chain transfer agent.

EXAMPLE 13 (REFERENCE EXAMPLE)

Five hundred grams of the product obtained in Example 7 was charged into a separable flask of 300 ml capacity and heated to 200° C. and then subjected to heat treatment in a nitrogen gas stream for 24 hours.

After the heat treatment and cooling to room temperature, the resulting product (yield: 78%) having a kinetic viscosity of 61 Cst was subjected to determination of active oxygen content, and it was found that iodine was not liberated from sodium iodide and thus the product had no oxidative power. The active bromine content was 0.74% by weight, which was a little increased from the content before the heat treatment, that is, 0.66% by weight.

EXAMPLE 14 (REFERENCE EXAMPLE)

The heat treatment was carried out in the same manner as in Example 13, except that the heating temperature was changed to 180° C., whereby a product having a kinetic viscosity of 120 Cst and an active oxygen content of 0.8% by weight was obtained in yield of 85%.

EXAMPLES 15-18 (REFERENCE EXAMPLE)

The heat treatment of the product obtained in Example 6 as a starting material was carried out in the same manner as in Example 13, except for the conditions shown in the following Table 2, whereby products with the properties given in the same Table 2 were obtained.

TABLE 2

| | | Example No. | | | |
|---|---|---|---|---|---|
| Item | | 15 | 16 | 17 | 18 |
| Starting material | (g) | 500 | 300 | 300 | 300 |
| Reaction temp | (°C.) | 200 | 180 | 220 | 240 |
| Reaction time | (hrs) | 24 | 24 | 24 | 18 |
| Kinetic viscosity of product | (Cst) | 21 | 23 | 18 | 18 |
| Active oxygen content | (%) | 0.1 | 0.6 | 0 | 0 |
| Yield | (%) | 70 | 72 | 63 | 60 |

The product of Example 18 had an active bromine content of 0.73% by weight which was substantially equal to the content before the heat treatment, i.e. 0.74% by weight.

EXAMPLE 19 (REFERENCE EXAMPLE)

Three hundred grams of the product obtained in Example 6 and 6 kg of trichlorotrifluoroethane were charged into a reactor of 6 l capacity and exposed to ultraviolet irradiation through a quartz tube by using a 400 W, high pressure mercury lamp at 0° C. for 24 hours. The product had a kinetic viscosity of 13 Cst and was neutral, that is, had no more oxidative power. The active bromine content was 0.75% by weight which was substantially equal to the content before the heat treatment, i.e. 0.74% by weight.

EXAMPLES 20-23 (REFERENCE EXAMPLE)

The ultraviolet irradiation was carried out in the same manner as in Example 19, except for the conditions shown in the following Table 3. Product having the properties given in the same Table 3 were obtained. The amount of the solvent in Example 23 was 2 kg.

TABLE 3

| | | Example No. | | | |
|---|---|---|---|---|---|
| Item | | 20 | 21 | 22 | 23 |
| Product as starting material | | EX. 6 | EX. 6 | EX. 8 | EX. 8 |
| Starting material | (g) | 300 | 500 | 300 | 1000 |
| Reaction temp. | (°C.) | 10 | 20 | 20 | −10 |
| Reaction time | (hrs) | 24 | 24 | 24 | 48 |
| Kinetic viscosity of product | (Cst) | 31 | 32 | 29 | 33 |
| Active oxygen content | (%) | 0.01 | 0.03 | 0 | 0.02 |
| Yield | (%) | 68 | 72 | 65 | 73 |

The active bromine content of the product of Example 22 was 0.78% by weight, which was a little increased from the content before the ultraviolet irradiation, i.e. 0.70% by weight.

EXAMPLE 24 (REFERENCE EXAMPLE)

The products obtained in Examples 13 and 19 were those subjected to heat treatment or ultraviolet irradiation, respectively, and thus had active bromine as bonded in the molecules.

A mixture of 150 g each of these products was charged into a separable flask and heated to 200° C., and a 20% fluorine gas diluted with nitrogen was fed therein for 24 hours while keeping the mixture at that temperature. The resuling product had a kinetic viscosity of 18

Cst and contained no more active bromine atoms. That is, perfluoropolyether whose active bromine atoms have been completely replaced with fluorine was obtained.

EXAMPLE 25 (REFERENCE EXAMPLE)

Three hundred grams of the product obtained in Example 13 (active bromine content: 0.76% by weight, kinetic viscosity: 61 Cst) was subjected to fluorination treatment in the same manner as in Example 24, whereby a product having a kinetic viscosity of 51 Cst was obtained. It was found that the product had no more active bromine atoms.

EXAMPLE 26 (REFERENCE EXAMPLE)

The product obtained in Example 18 (active bromine content: 0.73% by weight, kinetic viscosity: 18 Cst) was subjected to fluorination treatment in the same manner as in Example 24, except that the treating temperature was changed 230° C., whereby a product having a kinetic viscosity of 11 Cst was obtained. It was found that the product had no more active bromine atoms.

EXAMPLE 27 (REFERENCE EXAMPLE)

The product obtained in Example 22 (active bromine content: 0.78% by weight, kinetic viscosity: 29 Cst) was subjected to fluorination treatment in the same manner as in Example 24, except that the treating temperature was changed 180° C., and treatment the treating time to 8 hours, whereby a product having an active bromine content of 0.16% by weight and a kinetic viscosity of 14 Cst was obtained.

EXAMPLE 28 (REFERENCE EXAMPLE)

The fluorination treatment was carried out in the same manner as in Example 24, except that the fluorination time was changed to 8 hours, whereby a product having a kinetic viscosity of 23 Cst and an active bromine content of 0.1% by weight was obtained.

What is claimed is:

1. A process for producing a perfluoropolyether having a molecular weight of about 200 to about 25,000, whose main chain is composed of a combination of the following structural units arranged linearly at random and which contains 0.1 to 10% by weight of chlorine, bromine or iodine atoms as bonded in the molecule:

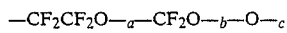

wherein
 $a+b=2-230$,
 $b/a=0.1-10$, and
 $c/(a+b)=0.01-1.0$
which comprises reacting tetrafluoroethylene with oxygen in a fluorinated solvent or a chlorofluorinated solvent under ultraviolet irradiation and the addition of carbon tetrabromide or carbon tetraiodide.

2. A process according to claim 1 wherein the halogenated hydrocarbon chain transfer agent is used in the order of $10^{-7}$ to $10^{-2}$ moles per W ultraviolet output power.

3. A process according to claim 1 wherein the chain transfer agent is carbon tetrabromide.

4. A process according to claim 1 wherein the chain transfer agent is carbon tetraiodide.

* * * * *